Nov. 24, 1959 R. N. SABEE 2,913,862
MACHINE FOR FORMING AND FILLING FOIL PACKETS
Filed March 29, 1955 12 Sheets-Sheet 1
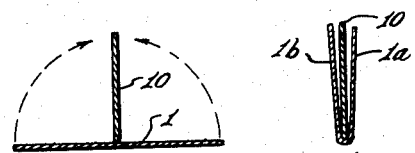
FIG. 2.
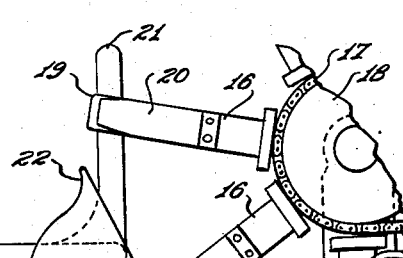
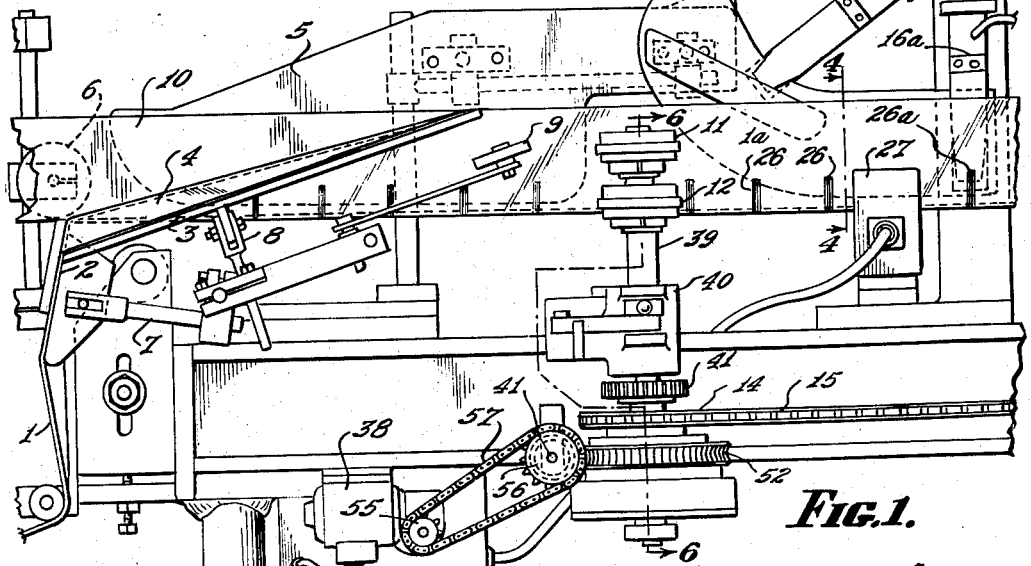
FIG. 1.
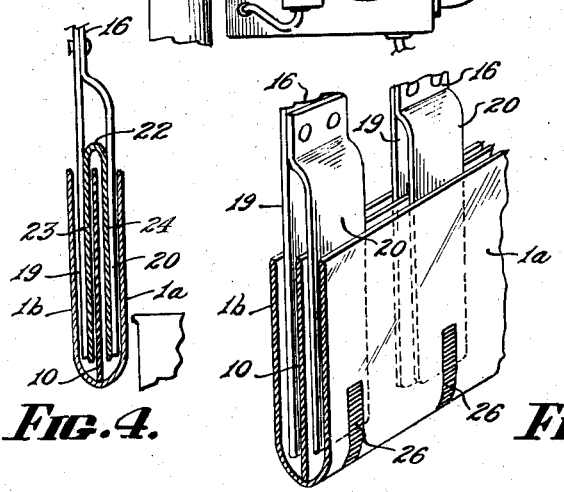
FIG. 4.
FIG. 5.
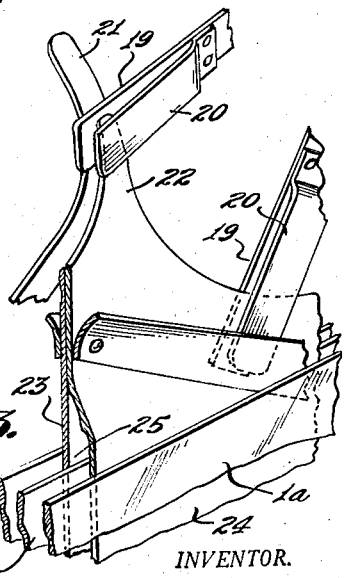
FIG. 3.
INVENTOR.
REINHARDT N. SABEE,
BY Allen & Allen
ATTORNEYS.

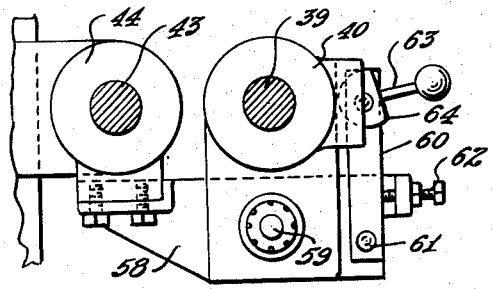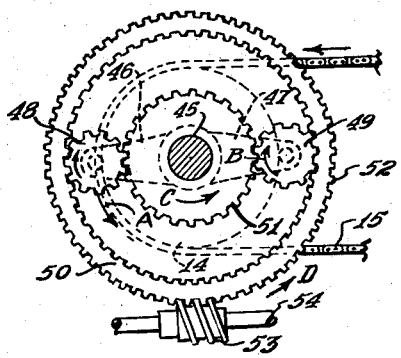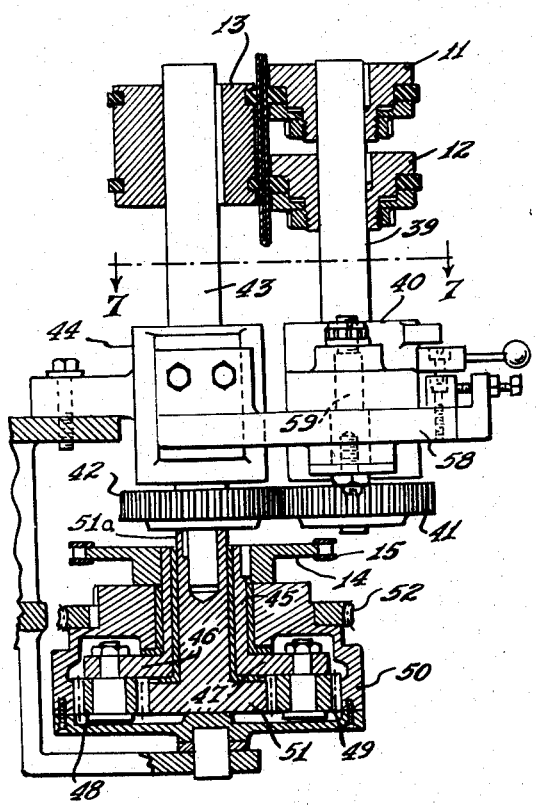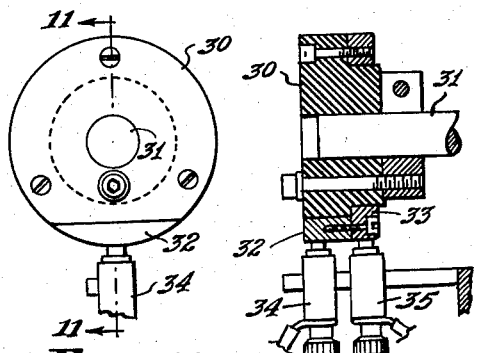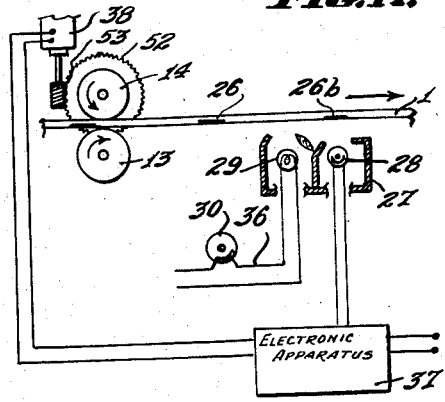

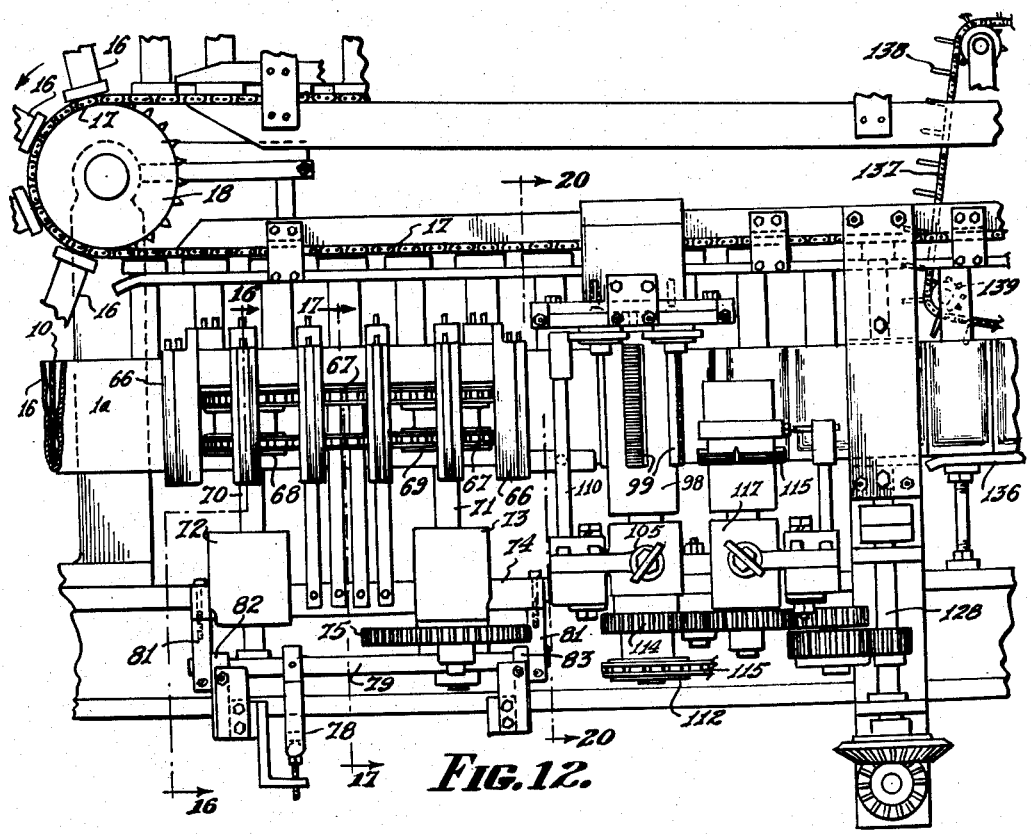

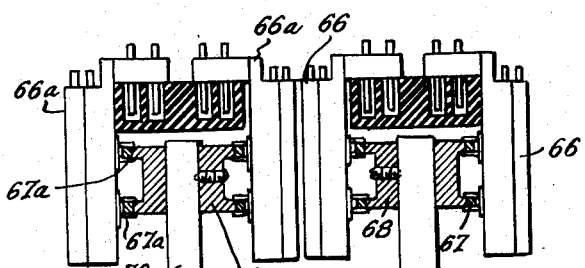
FIG.16.
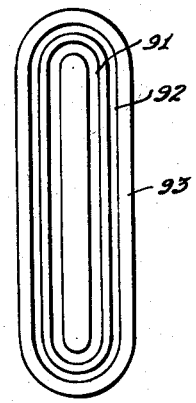
FIG.18.
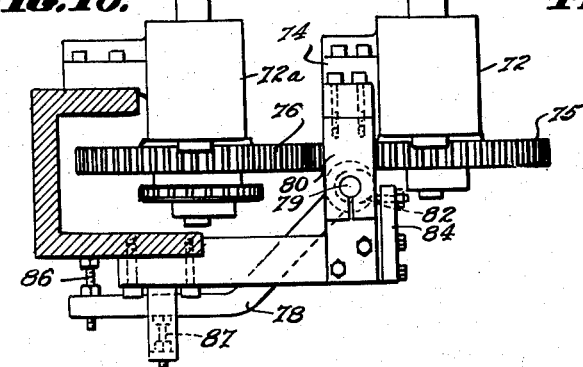
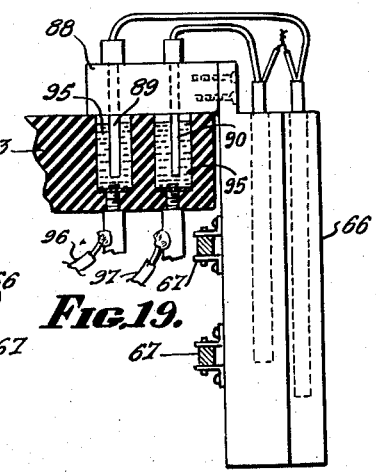
FIG.19.
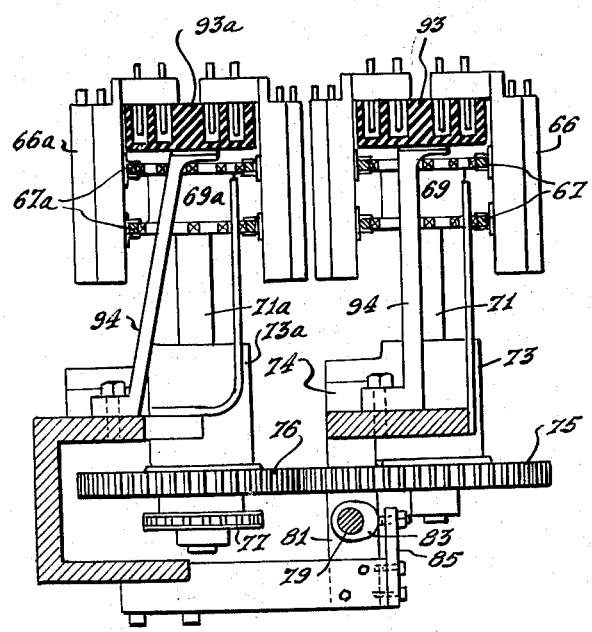
FIG.17.
INVENTOR.
REINHARDT N. SABEE
BY Allen & Allen
ATTORNEYS.

Nov. 24, 1959  R. N. SABEE  2,913,862
MACHINE FOR FORMING AND FILLING FOIL PACKETS
Filed March 29, 1955  12 Sheets-Sheet 5

INVENTOR.
REINHARDT N. SABEE
BY Allen & Allen
ATTORNEYS.

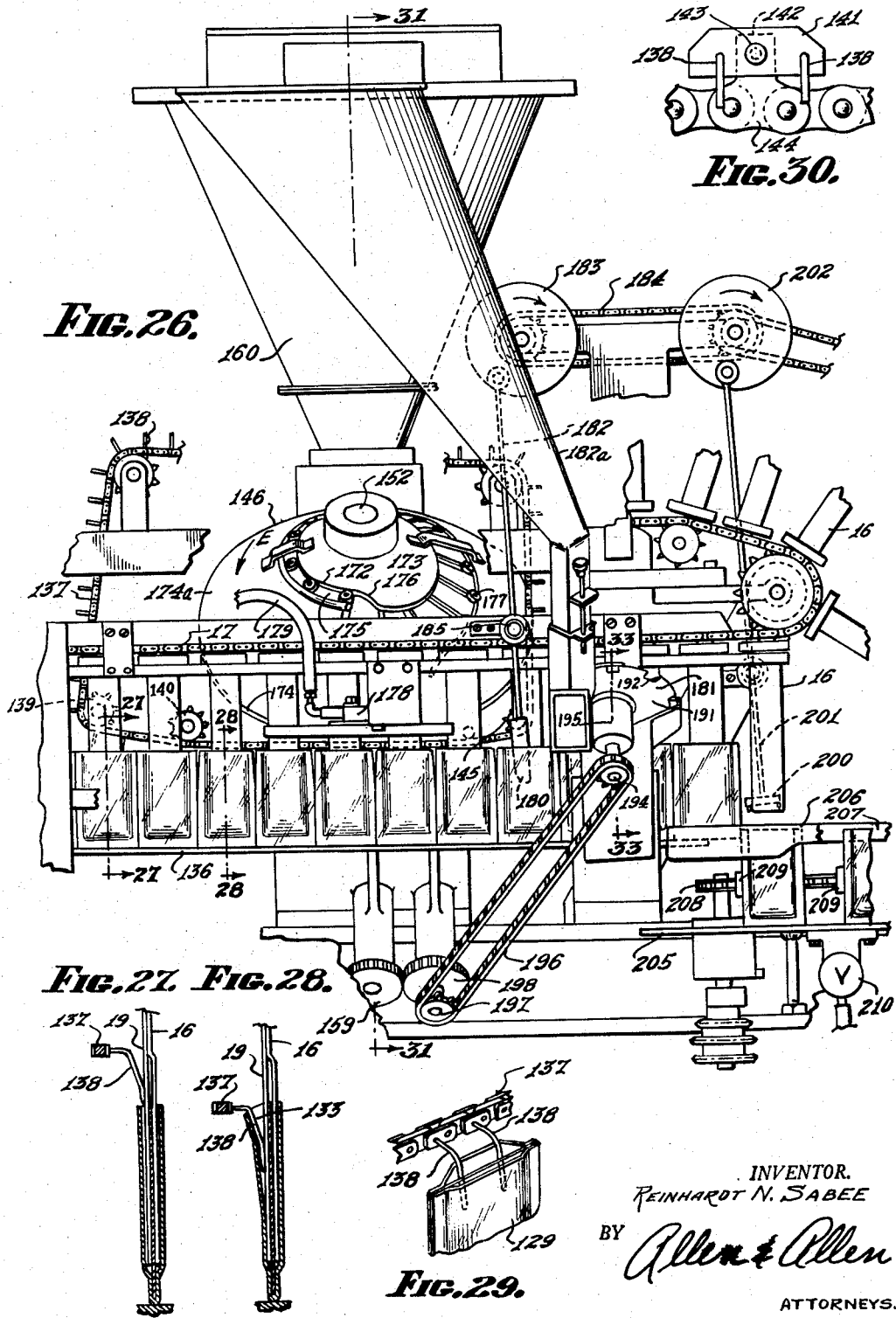

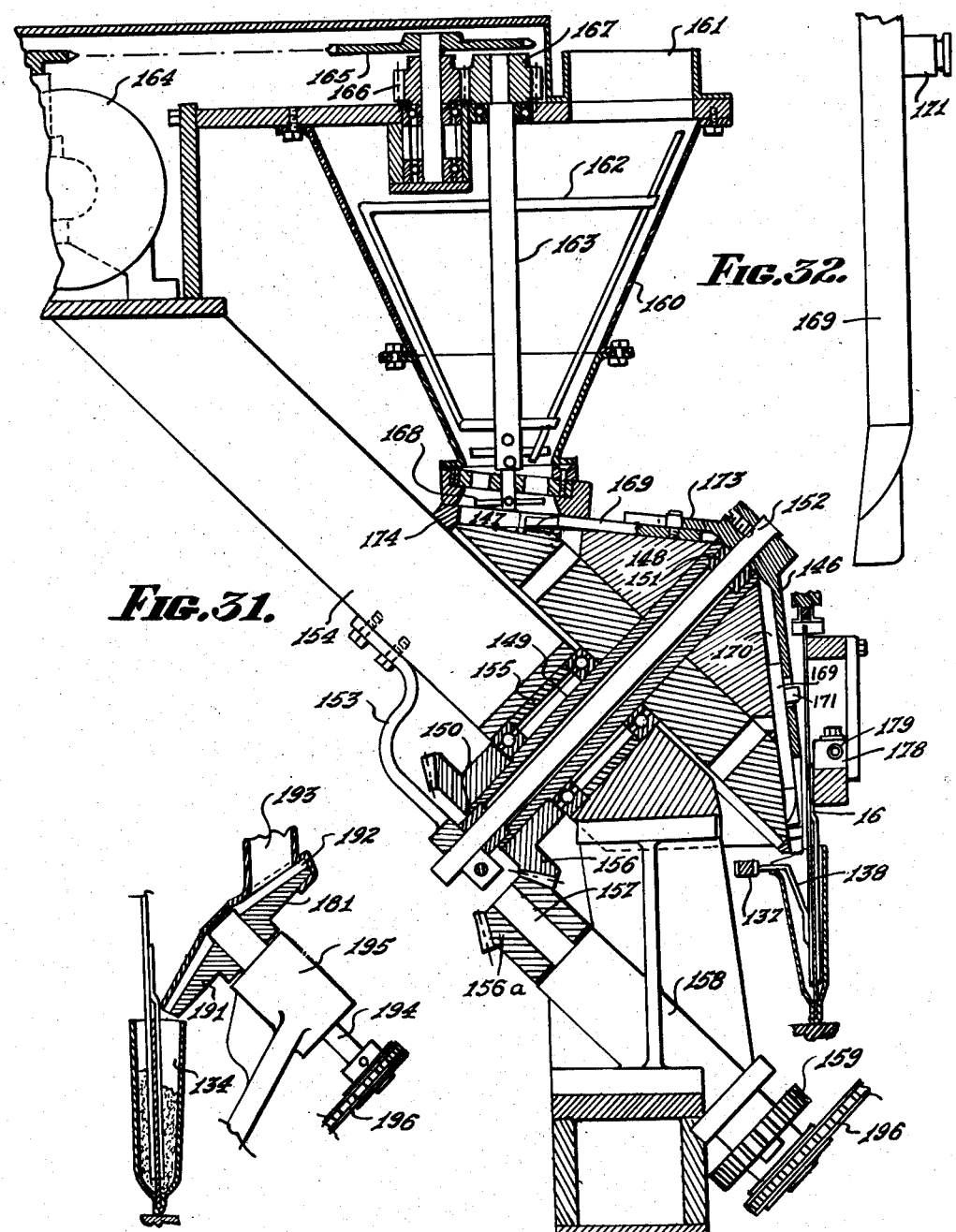

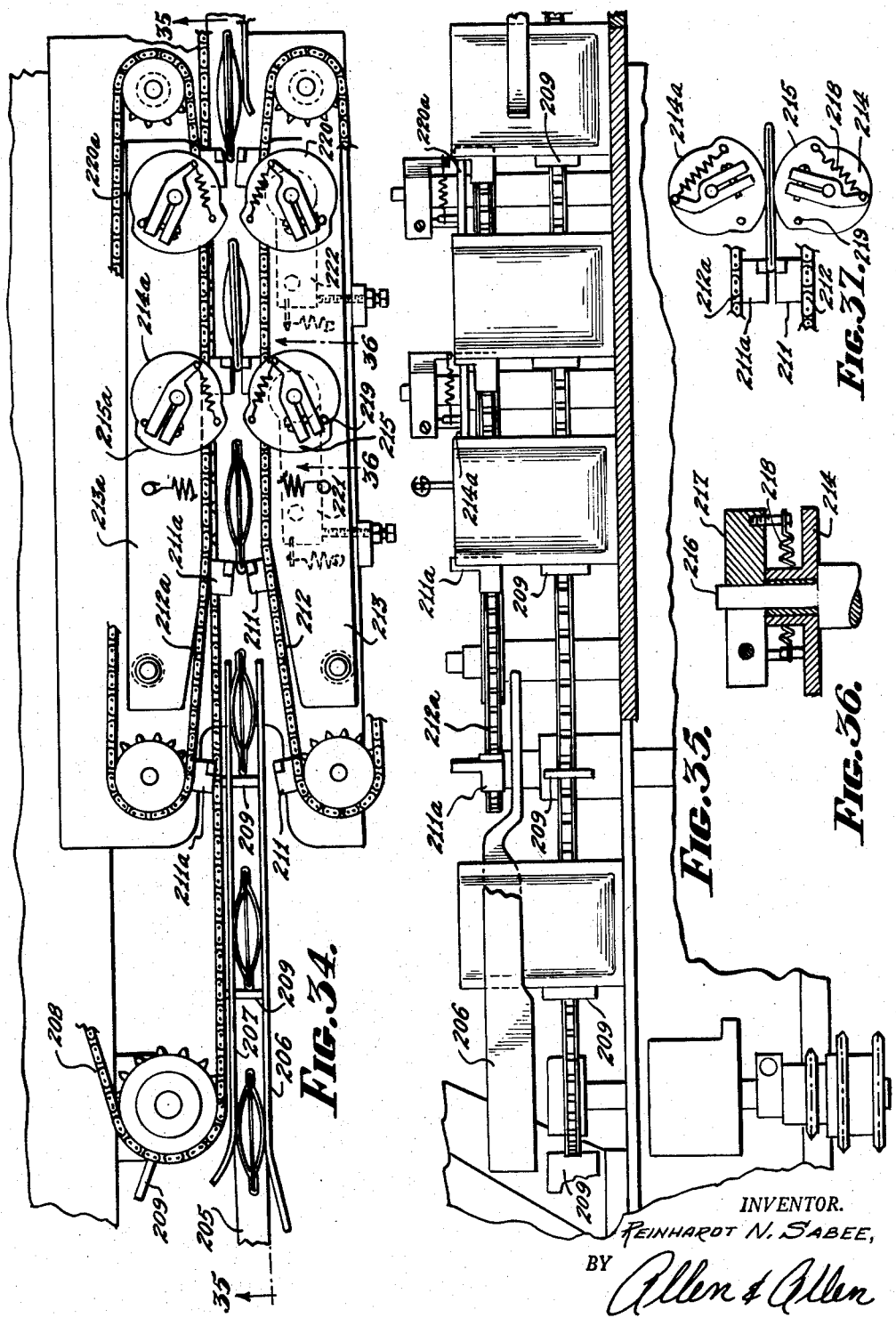

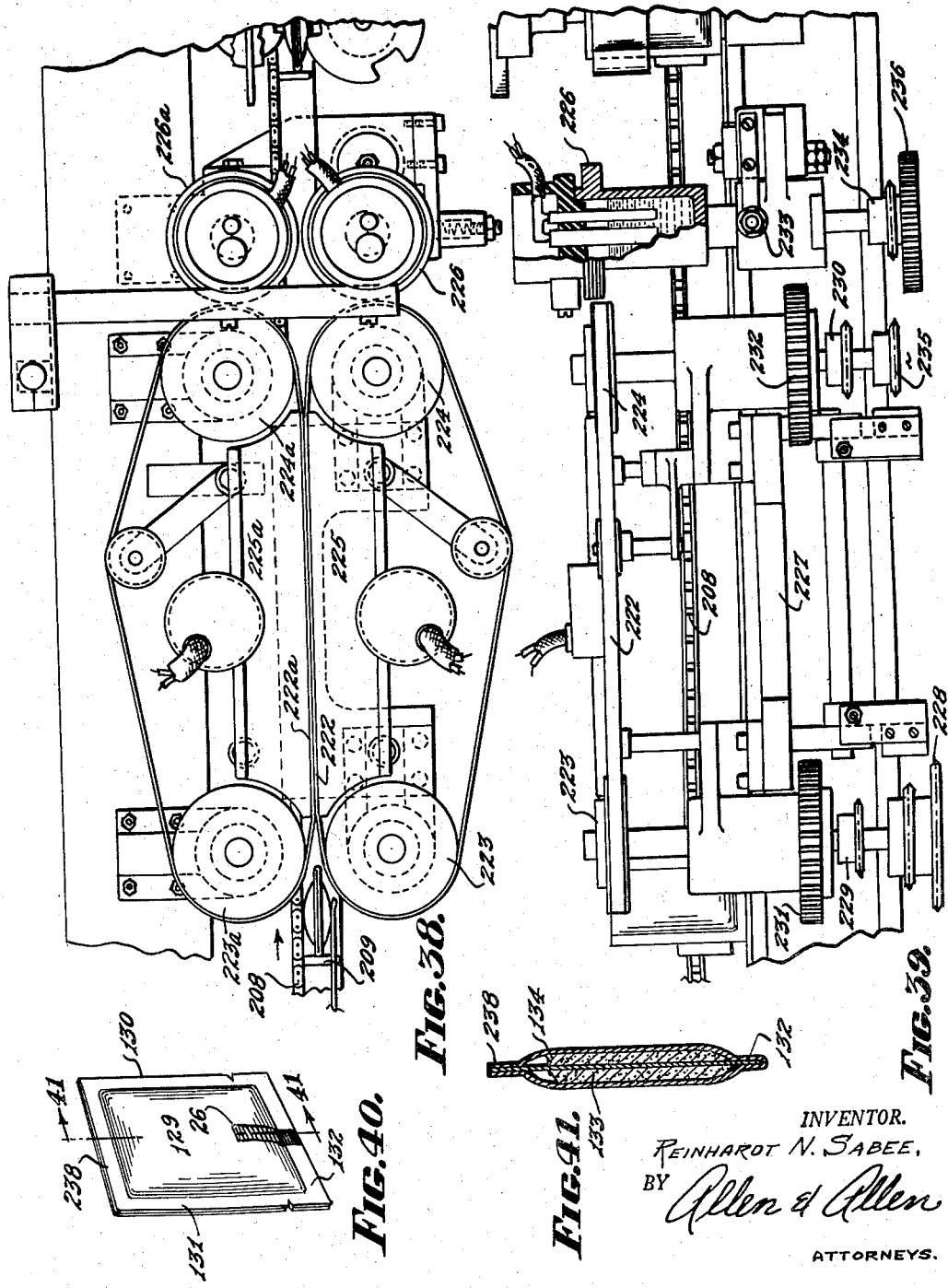

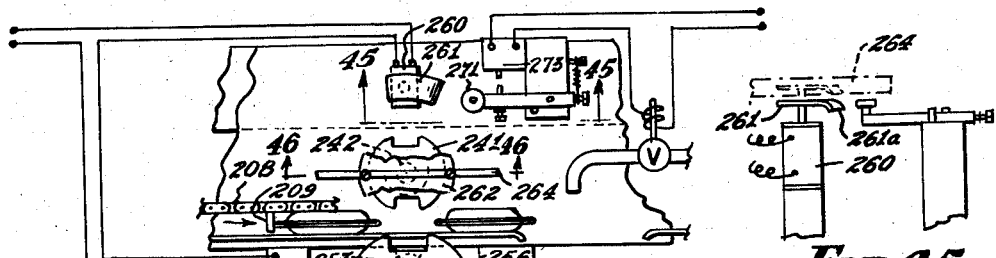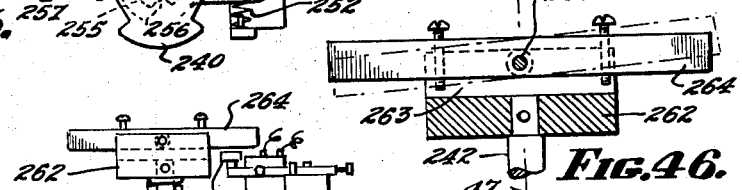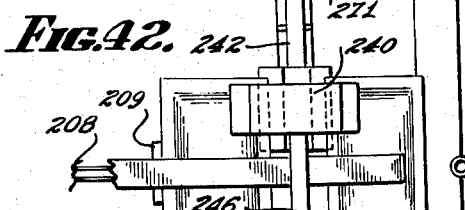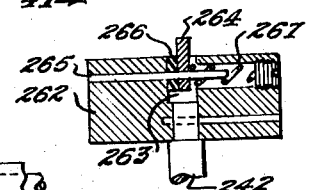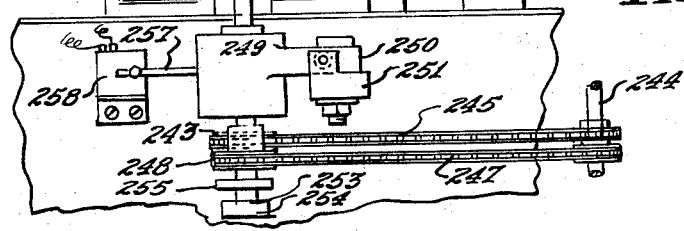

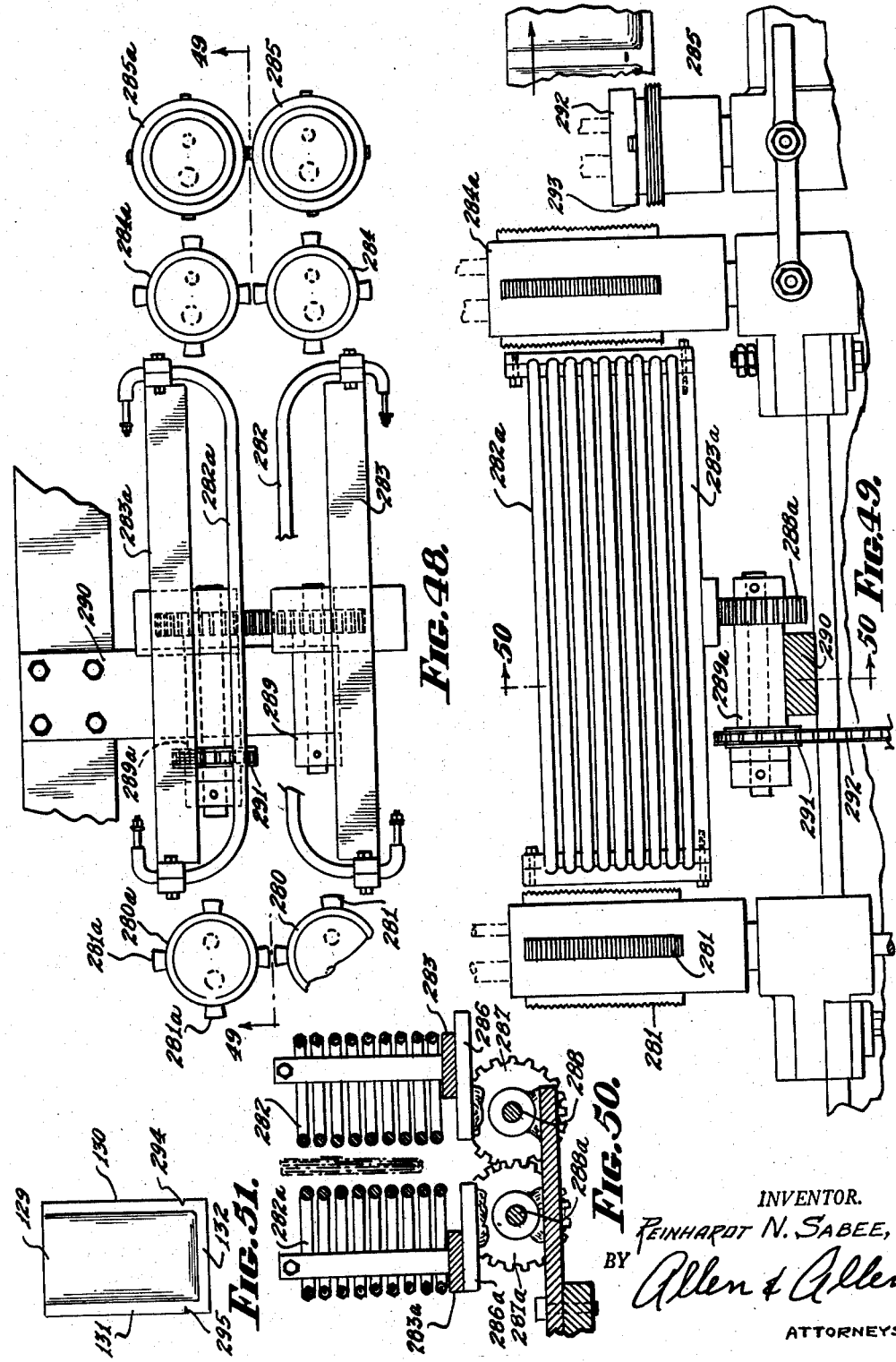

Nov. 24, 1959 R. N. SABEE 2,913,862
MACHINE FOR FORMING AND FILLING FOIL PACKETS
Filed March 29, 1955 12 Sheets-Sheet 12
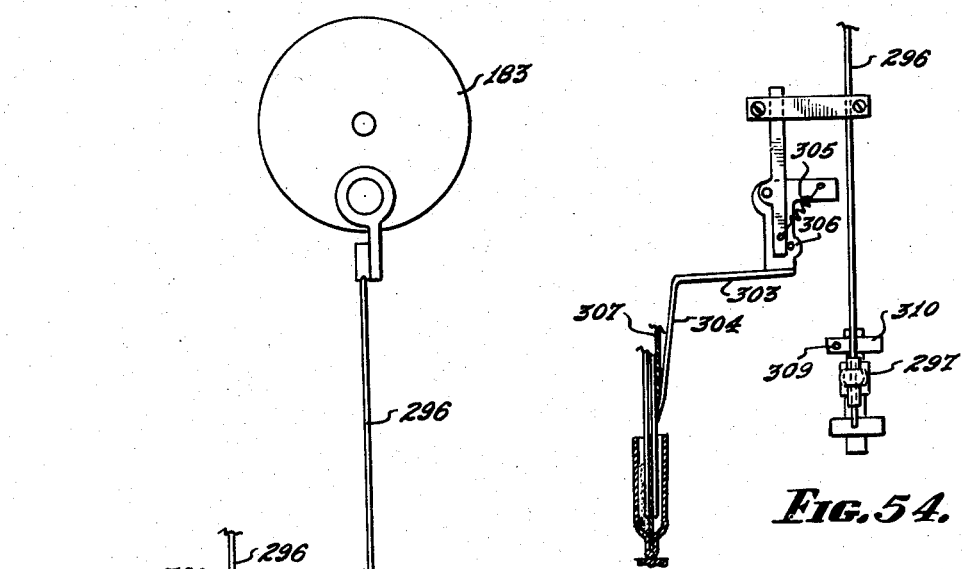
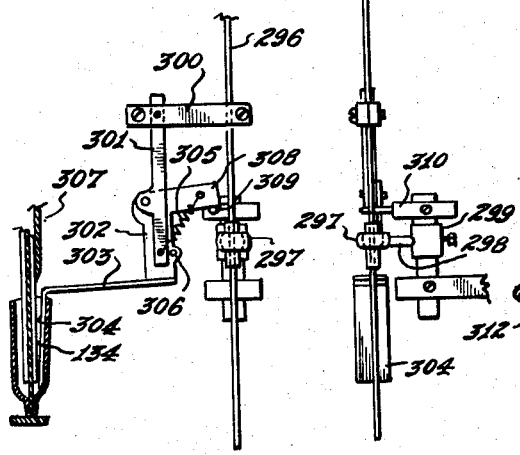
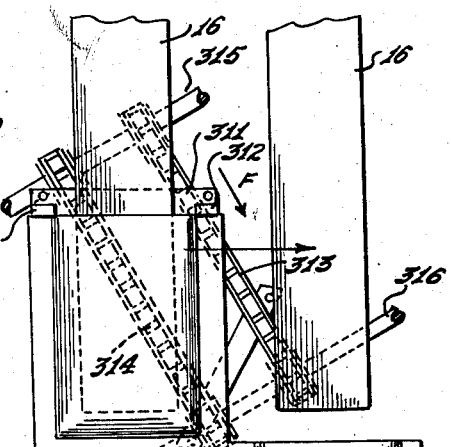
FIG. 54.
FIG. 53.   FIG. 52.
FIG. 55.
INVENTOR.
REINHARDT N. SABEE,
BY Allen & Allen
ATTORNEYS.

United States Patent Office 2,913,862
Patented Nov. 24, 1959

2,913,862

MACHINE FOR FORMING AND FILLING FOIL PACKETS

Reinhardt N. Sabee, Appleton, Wis., assignor to Circle Machinery & Supply Company, Appleton, Wis., a corporation of Wisconsin Application March 29, 1955, Serial No. 497,633

28 Claims. (Cl. 53—53)

This invention relates to apparatus and a method for forming and filling foil packages, and more particularly to the formation of double compartment packets in which each compartment is adapted to be filled with a separate material.

In general the invention has as its object the packaging of measured increments of powdered or granular substances in double compartment packets formed from thin sheet material which is itself thermoplastic or has a thermoplastic or fusible coating so that juxtaposed layers of the material can be fused or sealed together by the application of heat and pressure. The formation and filling of the packets is accomplished in a continuous operation beginning with the provision of webs of sheet material which are formed into double compartment packets, and ending with the delivery of individual filled and sealed packets.

In accordance with my invention double compartment packets are formed by medially folding a first or outer web of sheet material to form opposite walls for the packets and interposing therebetween a second or inner web of sheet material for dividing the packets into two compartments. As the first or outer web in being folded about the second or inner web, continuously moving guiding and blocking members in the form of spring fingers engage opposite sides of the inner web at spaced intervals, whereupon the juxtaposed webs are contacted by preheating bars and then by sealing means acting to fuse the webs together at spaced transverse intervals between the spring fingers and along their common bottom edges, thereby forming a continuous strip of double compartment packets sealed along their side and bottom edges and open at their upper ends.

Since the outer web of sheet material which forms the walls of the packets will bear printed indicia, such as brand identification, instructions or advertising, means are provided for adjusting the feeding speed of the webs so as to maintain proper registry of the outer web with respect to the spring fingers and the sealing means thereby insuring proper centering or registry of the printed indicia with respect to the side edges of the sealed packets.

Subsequent to the formation of a continuous strip of open-ended packets, timed severing means are provided to sever the strip into individual packets which are then moved along on the spring fingers. As the packets are moved along, gripping prongs engage and expand the outer walls of the packets, whereupon measured increments of filling materials are introduced into the compartments thereof. Following the introduction of the filling materials, the packets are removed from the spring fingers and conveyed to tensioning mechanism which engages the leading and trailing edges of the packets and applies pressure tending to flatten them out, thereby juxtaposing their upper edges for final sealing. Preheating and pressure applying means then seal the tops of the packets closed and they are then discharged from the machine. As the sealed packets are about to be discharged from the machine, means are provided to reject improperly filled packets.

In accordance with the above, further objects of my invention are the provision of spring steel fingers which are instrumental in forming the packets and in filling their two compartments with granular or powdered material, the means employed for obtaining registration of the printed indicia on the outside of each packet, the means employed for preheating and sealing selected portions of the sheet material during continuous operation, the severance of the sealed strip into individual packets, the feeding means for measuring the substance to be filled and for compacting and charging each measured slug into a compartment of the packet, the mechanism for removing the packets from the spring fingers, means for gripping and flattening the tops of the filled packets prior to the sealing of the upper ends thereof, and the sensing means for detecting and rejecting packets which have not been properly filled with measured increments of filling substance.

My invention further resides in the methods and in the features of construction and arrangement of parts hereinafter described and claimed.

For an understanding of my invention and for illustration of the various details and embodiments thereof reference is now made to the accompanying drawings wherein:

Figure 1 is a side elevational view of the initial section of the machine wherein the webs of sheet material are formed and engaged by the spring fingers.

Figure 2 is a diagrammatical vertical sectional view illustrating the manner in which the wall forming web is folded about the divider forming web.

Figure 3 is an enlarged fragmentary perspective view illustrating means for spreading the spring fingers.

Figure 4 is a vertical sectional view taken along the line 4—4 of Figure 1.

Figure 5 is an enlarged fragmentary perspective view illustrating adjacent spring fingers in engagement with the packet forming webs.

Figure 6 is a vertical sectional view taken along the line 6—6 of Figure 1 illustrating the means for maintaining proper registry of the outer wall forming web.

Figure 7 is a horizontal sectional view taken along the line 7—7 of Figure 6.

Figure 8 is a side elevation of the gearing for the feeding roller compensating means.

Figure 9 is a schematic diagram illustrating the operation of the feed compensator.

Figure 10 is a front elevational view of a commutator or timing device employed for periodically energizing a light source in timed relation to the travel of the packaging material.

Figure 11 is a section view taken along the line 11—11 of Figure 10.

Figure 12 is a fragmentary elevational view comprising a continuation of Figure 1 and showing the folded webs of a sheet material moving through a preheating device, a seam sealing device, a bottom sealer, and a cut off knife.

Figure 13 is a diagrammatic plan view further illustrating the devices of Figure 12.

Figure 14 is a perspective view of a double compartment packet prior to filling.

Figure 15 is a fragmentary sectional view taken along the line 15—15 of Figure 14 illustrating the manner in which the bottom of the packet is sealed.

Figure 16 is a vertical sectional view taken along the line 16—16 of Figure 12 showing details of construction of the preheating device.

Figure 17 is a similar view taken along the line 17—17 of Figure 12.

Figure 18 is a plan view of a member employed as a reservoir for pools of mercury.

Figure 19 is an enlarged fragmentary sectional view illustrating a portion of Figure 16 in greater detail.

Figure 26 is an elevational view comprising a continuation of the device illustrated in Figure 12.

Figure 27 is a sectional view taken along the line 27—27 of Figure 26.

Figure 28 is a sectional view taken along the line 28—28 of Figure 26.

Figure 29 is a fragmentary perspective view illustrating means for spreading the walls of the packets.

Figure 30 is a side elevation illustrating an alternative form of spreading device.

Figure 31 is a detailed vertical sectional view of the filling device taken along the line of 31—31 of Figure 26.

Figure 32 is a side elevational view of an ejector or plunger employed in the filling device of Figure 31.

Figure 33 is a fragmentary sectional view taken along the line 33—33 of Figure 26.

Figure 34 is a plan view of a continuation of the machine illustrated in Figure 26.

Figure 35 is a vertical sectional view taken along the line 35—35 of Figure 34.

Figure 36 is a fragmentary section taken along the line 36—36 of Figure 35.

Figure 37 is a fragmentary plan view showing certain of the parts of Figure 34 in an alternate position.

Figure 38 is a continuation of the device illustrated in Figure 35.

Figure 39 is a side elevational view of the device illustrated in Figure 38.

Figure 40 is a perspective view of a filled and sealed packet.

Figure 41 is a sectional view taken along the line 41—41 of Figure 40.

Figure 42 is a continuation of Figure 35 showing details of means for ejecting improperly filled packets.

Figure 43 is a plan view of the mechanism illustrated in Figure 42.

Figure 44 is a view similar to Figure 43 showing an alternate position of parts.

Figure 45 is a fragmentary section taken along the line 45—45 of Figure 43.

Figure 46 is a sectional view taken along the line 46—46 of Figure 43.

Figure 47 is a sectional view taken along the line 47—47 of Figure 46.

Figure 48 is a plan view showing an alternate means for preheating the webs of the sheet material preparatory to the initial sealing thereof.

Figure 49 is a sectional view taken along the line 49—49 of Figure 48.

Figure 50 is a sectional view taken along the line 50—50 of Figure 49.

Figure 51 is an elevational view of a bag having the tear off notches located in an alternate position.

Figure 52 is a front elevational view illustrating a preferred embodiment of a device for partially opening the bags preparatory to the introduction of the filling material therein.

Figure 53 is a fragmentary side elevation of the device of Figure 52.

Figure 54 is a side elevation of the device of Figure 53 in an alternate position.

Figure 55 is a side elevation of a preferred form of packet stripping device.

Figure 21:
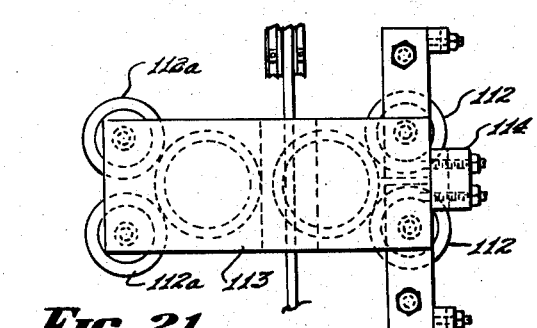
Figure 21 is a plan view illustrating certain of the parts of Figure 20.

It is to be understood that the embodiment of the invention which is now to be described in detail is susceptible to various modifications and alternative arrangements of parts, some of which have been illustrated and others of which will be apparent to the skilled worker in the art; and I do not intend to limit the invention specifically to the disclosed embodiment but rather intend to encompass all modifications and alternative constructions falling within the spirit and scope of the invention as expressed in the claims which form a part hereof.

*Web feeding and forming means*

Referring now to Fig. 1 of the drawings, 1 represents a web of sheet material for forming the opposite walls of the packet. It will be understood that the web 1 will be fed from a supply roll (not shown) mounted adjacent the leading end of the machine. The web 1, hereinafter referred to as the outer web, is fed into the machine in substantially horizontally disposed condition and led against the inclined face 2 of an adjustable forming member 3 having outwardly inclined generally triangular forming faces 4 which act to fold the web upwardly about the bottom edge of a forming plate 5. An idler roller 6 contacts the forming member adjacent the upper edge of the inclined face 2 to assist in the initial folding of the web as it is led over the forming member. Suitable adjustment means, indicated at 7 and 8, may be provided to adjust the forming member; and the folded outer web may also be contacted by guide rollers 9 acting to press the folded sides of the web against the forming plate.

A second web of sheet material 10 is adapted to be fed into the machine in substantially vertical position and sandwiched between the folded sides of the outer web, the inner web making sliding contact with one side of the forming plate 5 with its lower edge positioned along the crease of the folded outer web. The folding action is diagrammatically illustrated in Figure 2 wherein, in the lefthand portion of the figure, the second or inner web 10 is shown disposed at right angles with respect to the initially horizontal web 1, whereupon the opposite sides of the web 1 are folded upwardly to form opposed sides 1a and 1b, as illustrated in the righthand portion of Figure 2.

It will be understood that the outer web will have a width equal to substantially twice the width of the inner web 10 which serves to divide the packets into side-by-side compartments. In a preferred embodiment of my invention the webs of sheet material will be formed from foil, the web 1 having acetate printing on its outer surface and a heat sealing vinyl coating on its inner surface. The inner web 10 will have a vinyl coating on both sides thereof. It will be understood that other sheet materials inherently heat sealable or suitably coated with heat fusible surface layers may be employed in lieu of the material specifically mentioned without departing from the spirit or scope of the invention.

The webs 1 and 10 are drawn from their respective supply rolls and advanced into the machine by means of feed rollers 11, 12 contacting the side 1a of the outer web and the coacting feed roller 13 contacting the opposite side 1b thereof. These rollers are driven by means of sprocket 14 and drive chain 15, the chain being operatively connected to the main drive shaft of the machine which is powered by a prime mover (not shown.) Details of the manner in which the feed rollers are driven will be described hereinafter in conjunction with the feeding speed compensator. It will be understood, however, that the feed rollers 11, 12 and the roller 13 are positioned to engage the webs between them and advance the webs jointly through the machine.

Spring fingers

As the webs of material are advanced beyond the feed rollers the inner web 10 is engaged by guiding and blocking members 16 in the form of spring fingers which are adapted to be inserted between the folded sides of the outer web for contact with opposite sides of the inner web. As best seen in Figures 1 and 12 the members 16 are mounted at spaced intervals along an endless chain 17 which, at its leading end, passes around a sprocket 18 journaled in a support extending upwardly from the machine frame. The chain and the members carried thereby overlie and are in alignment with the path of travel of the advancing webs.

Each of the members 16 comprises a pair of spring fingers 19 and 20 which may be biased into gripping engagement with each other at their free ends. As the fingers pass around the sprocket 18 in a counterclockwise direction they contact an upstanding guide member 21 along which the fingers are guided for contact with a separator 22 which spreads the two fingers apart as they approach the advancing webs. The separator 22 may be conveniently formed as a rearward extension of the forming plate 5 and, as best seen in Figure 3, will terminate downwardly in spaced apart extensions 23 and 24 defining a narrow channel or passageway 25 through which the inner web 10 is passed, the extensions 23 and 24 extending downwardly between the inner web 10 and the sides 1a and 1b of the outer web. As each of the members 16 moves downwardly over the separator its fingers will also lie between the sides of the folded web 1 and the inner web 10, in the manner illustrated in Figure 4. Upon passage of the members beyond the separator 22, the spring fingers will be released for contact with opposite sides of the inner web 10, the fingers engaging the inner web in substantially the manner illustrated in Figure 5. The members 16 will be spaced apart by a distance such that transverse sealing means may be interposed therebetween to form the side seams for the packets, the width of the fingers corresponding to substantially the width of the compartments of the individual packets. A primary function of the fingers is to block the compartments of the packets so as to separate the walls thereof during preheating, thereby preventing possible fusing together of the walls in areas other than those which are to be sealed. The spring fingers are also important as a means for guiding and conveying the packets through a major portion of the machine and, as will be explained hereinafter, the fingers also assist during filling to guide the filling material into the compartments. The spring fingers may be biased toward each other so as to grip the sides of the inner web or they may simply extend downwardly in slightly spaced apart relation in which they merely contact the walls of the packets without positive gripping engagement.

Feeding speed compensator

Since the outer web will carry printed indicia which must be in registry with the spring fingers and the sealing means if it is to be centered with respect to the individual packets, I have found it desirable to operate the feed rollers 11, 12 and 13 at a driving speed slightly in excess of the speed of the spring fingers and sealing means, and provide automatically acting compensating means to intermittently retard the speed of the feeding rollers and thereby synchronize the movement of the webs with that of the spring fingers and sealing means.

Registration of the outer web relative to the members 16 and the sealing means is obtained by means of spaced apart marks 26 (Figures 1 and 9) imprinted on the wall 1a of the outer web. The spacing between the centers of adjacent marks is equivalent to the width of the packets and may conveniently denote the vertical center line of each packet to be formed. If this is the case, when the machine is initially set up for operation, the mark 26a will be brought into alignment with the center of the member 16a (Figure 1), thereby establishing proper initial registration. When the web is in proper registry, one of the marks, such as the mark 26b in Figure 9, will lie immediately adjacent an electronic detector 27 which may comprise a photoelectric cell 28 adapted to be energized by a light source 29. The light source is arranged to direct a beam of light against the moving outer web from whence it is reflected to the photoelectric cell. The marks 26 are of such character that they will reflect an insufficient amount of light to activate the photoelectric cell. The remainder of the outer web, on the other hand, will be of a more reflective character and will reflect sufficient light to excite the photoelectric cell. Consequently when the outer web is in proper registry, the photoelectric cell will not be energized; but if it is out of registry, then the photoelectric cell will be energized.

The light source 29 is arranged to flash in timed relation to the movement of the spring fingers and sealing means. The flashing of the light source is controlled by means of a commutator 30 mounted on a shaft 31 (Figures 10 and 11) driven in timed relation with the spring fingers and sealing means, the commutator making one revolution during the time interval required for the spring fingers to move a distance equal to the width of one packet. The commutator is provided with contacts 32 and 33 arranged to contact brushes 34 and 35 to thereby close the circuit to the light source through lead line 36. With this arrangement, when the outer web is in proper registry, the light source will flash just as the marks pass the photoelectric cell and the cell will remain dormant. The light source will activate the photoelectric cell only at such times as the outer web moves ahead out of registry sufficiently for the flash of light to strike in back of the marks 26. Activation of the photoelectric cell will cause it to energize electronic apparatus, indicated at 37, which starts the motor 38 and through a series of compensating gears reduces temporarily the speed of the feed rollers 11, 12 and 13.

The compensating gear arrangement will be best understood by reference to Figures 1, 6 and 7 of the drawings wherein it will be seen that the feed rollers 11, 12 are keyed to a shaft 39 rotatably journaled in a mounting bracket 40 and driven by means of a gear 41 which meshes with a gear 42 fixed to a rotatable shaft 43 to which the feed roller 13 is keyed, the shaft 43 being journaled in a mounting bracket 44 secured to the machine frame. The gear 42 and hence the shafts 39 and 43 and the feed rollers mounted thereon are driven from sprocket 14 through sleeve 45 keyed to the sprocket 14. The sleeve 45 has projections 46 and 47 extending outwardly from its lower end to which are journaled planetary gears 48 and 49 which mesh at their outermost extremities with the driving gear 51 having an extending shank 51a keyed to the lower end of the rotatable shaft 43. By means of this arrangement the sprocket 14 will rotate the sleeve 45 and the projections 46 and 47 in a counterclockwise direction, as indicated by the arrow A in Figure 8. The planetary gears 48 and 49 are thus revolved in a counterclockwise direction, and, as they travel over the internal teeth of the gear box, they are rotated in a clockwise direction, as indicated by the arrows B. The clockwise rotary motion of the planetary gears serves to drive the driving gear 51 in a counterclockwise direction, as indicated by the arrow C, thereby rotating the shaft 43 and turning the feed rollers.

The internally toothed gear box 50 is held against movement by means of a worm gear 52 forming a part thereof, the worm gear being engaged by a worm 53 keyed to a shaft 54. The shaft 54 is driven by the motor 38, the shaft being operatively connected to the motor as by means of sprockets 55, 56 and chain 57 (Figure 1). When the motor is at rest the worm 53 will hold the worm gear 52 and hence the gear box 50 against rotation, and the feeding rollers will be driven from the sprocket 14 in the manner explained above. However, when the motor is started due to the activation of the photoelectric cell by the over advanced outer web, the worm 53 will rotate the gear box 50 in a counterclockwise direction, as indicated by the arrows D, thus causing it to travel in the same direction as the revolving planetary gears. Consequently, as the planetary gears are revolved by the projections 46 and 47 they will travel over a lesser number of teeth in the gear box 50 since the gear box is moving in the same direction as the projections. This results in a reduction in the speed of rotation of the planetary gears and hence the rate of rotation of the driving gear 51 will be reduced, thereby slowing down the speed of rotation of the shafts 39 and 43 and the feeding rollers carried thereby.

It will be understood that the motor 38 will be actuated intermittently as the electric eye is activated by successive flashes of the light source until the speed of the outer web is retarded sufficiently to bring the marks 26 into alignment with the photoelectric cell as the light source flashes. Since the normal speed of the feed wheels is such that the outer web will tend to be over fed, there is no problem of compensating for under feeding. The web is either being over fed or else its speed retarded by the compensating gears until proper registry is obtained, whereupon the web will again start to be over fed until further retarding is required.

I also prefer to adjustably mount the feed rollers 11, 12 so that they may be moved toward and away from the opposed feed roller 13 to compensate for variations in the thickness of the materials being handled. To this end the mounting bracket 40 is pivotally secured to a support 58 by means of a pivot pin 59. The mounting bracket is moved by means of a bar 60 which is pivoted at one end to the support 58 by a pivot pin 61 and provided with a screw adjustment 62 which engages the mounting bracket. Pivoting movement of the bar 60 and hence the mounting bracket 40 is obtained by rotating a lever 63 which has a cam surface 64 for controlling movement of the bar.

*Preheating, sealing and severing mechanism*

Referring now to Figures 12 and 13, the webs of sheet material with the spring fingers engaged therewith are fed between sets of traveling preheating bars 66 and 66a arranged to contact opposite sides of the outer web in transverse areas between adjacent gripping members 16. The preheaters contact the webs in the areas to be sealed together and serve to activate the fusible material of the webs for sealing.

As best seen in Figures 12 and 16, the preheating members 66 are mounted on chains 67, 67 which pass around double-headed sprockets 68 and 69 fixed to rotatable shafts 70 and 71, respectively. The shafts are journaled at their lower ends in brackets 72 and 73 secured to an adjustable mounting bracket 74. On the opposite side of the webs mating preheating members 66a are mounted on chains 67a, 67a passing around spaced apart sprockets 68a and 69a fixed to rotatable shafts 70a and 71a journaled in brackets 72a and 73a mounted to the machine frame. The preheaters 66 are driven by the shaft 71 and the gear 75 at the lower end thereof which meshes with a gear 76 fixed to the shaft 71a which in turn is driven by means of sprocket 77 and chain 78 operatively connected to the machine drive. It will be understood that the preheaters will be driven in timed relation to the movement of the spring fingers, the arrangement being such that mating pairs of the preheaters 66 and 66a will be juxtaposed between adjacent pairs of spring fingers and will travel with the spring fingers and webs throughout the length of the preheating section, the fingers acting to block the compartments being formed and prevent the webs from sticking together in areas other than those contacted by the preheating members.

The preheaters 66 may be adjusted relative to the preheater 66a through the adjustable mounting bracket 74, the position of which may be altered by moving the lever arm 78 connected to the rock shaft 79 journaled at its ends in the arms 80 and 81 forming a part of the mounting 74. The rock shaft carries eccentric cams 82 and 83 adapted to abut against stops 84 and 85. Through this expedient, movement of the lever arm 78, by means of the threaded adjustment members 86 and 87 will result in the desired spacing between the mating preheating members 66 and 66a.

The preheaters 66 and 66a are adapted to be heated electrically, each of the preheating members being provided with a rearward extension 88 mounting depending contacts 89 and 90. These contacts travel in channels 91 and 92 formed in an elongated plate 93 fixedly mounted on supporting brackets, such as the bracket 94 in Figure 17, the plate overlying the sprockets 68 and 69 in the manner illustrated. The plate 93 will be formed from a non-conductive material and the channels 91 and 92 will be filled with pools of mercury 95 or a similar current conducting liquid. Current will be fed to the pools of mercury through cables 96 and 97. With this arrangement, the preheating members will at all times have their contacts 89 and 90 partially submerged in the pools of mercury, thereby continuously receiving a supply of current. This arrangement eliminates the wearing out of brushes or contacts as is encountered in conventional sliding contacts.

I have found that preheating of the webs is necessary with presently available sealable sheet material if a dependable seam is to be formed in a continuous relatively high speed operation, and is also necessary that the preheating be of sufficient duration to bring the material to substantially its fusion temperature. Yet the preheating must be so controlled as to avoid scorching or burning of the material. To this end the traveling preheaters described above serve both to properly preheat the material and at the same time do so without slowing down the speed of the machine.

The bottom edges of the packets are preheated by the opposed pair of electrically heated shoes 66b and 66c between which the webs are moved. In joint use with the traveling preheaters 66a and 66b these shoes have been found to provide sufficient additional preheating to activate the fusible material along the bottom marginal edges of the packets.

Figure 23:
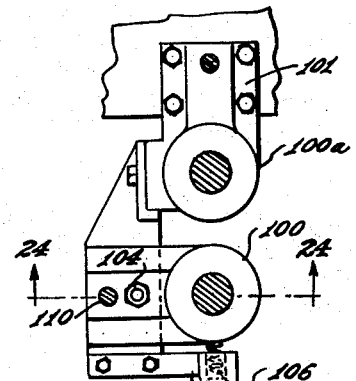
Figure 23 is a horizontal sectional view taken along the line 23—23 of Figure 22.
Figure 20:
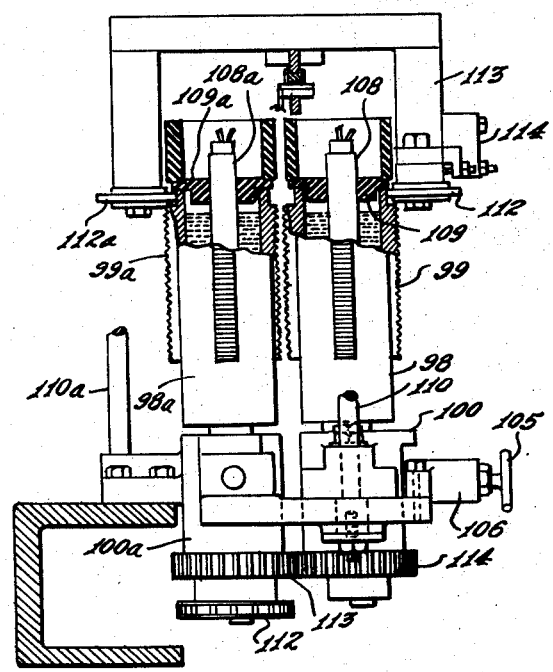
Figure 20 is a vertical sectional view taken along the line 20—20 of Figure 12.
Figure 22:
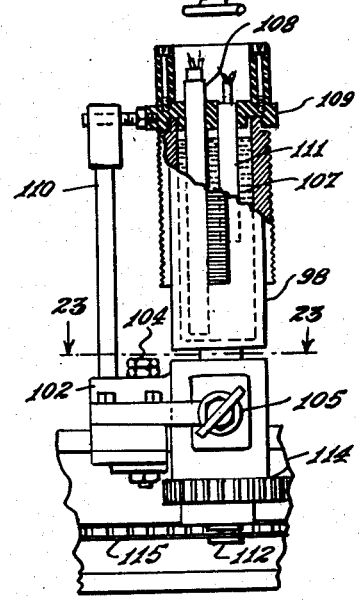
Figure 22 is an elevational view taken from the right side of Figure 20.
Figure 25:
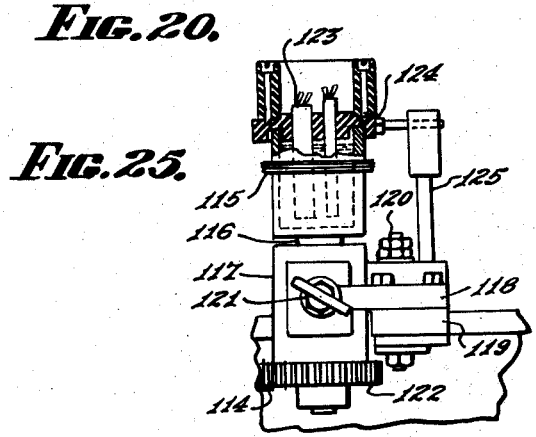
Figure 25 is a front elevational view of a bottom sealing device, with parts in section.
Figure 24:
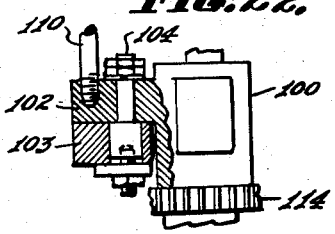
Figure 24 is a sectional view taken along the line 24—24 of Figure 23.

Following preheating, the heated areas of the webs are contacted by opposed sealing members 98, 98a carrying vertically disposed sealing bars 99 and 99a which act to compress and fuse together the transverse areas of the webs preheated by the preheaters 66 and 66a, the fusing together of the webs forming the side seams of the packets. As best seen in Figures 20 and 23, the sealing members 98 and 98a are journaled in brackets 100 and 100a, the latter bracket having an extension 101 fixedly securing it to the machine frame. The bracket 100 has an extension 102 (Figure 24) by means of which it is pivotally secured to a fixed support 103 by means of a pivot pin 104. The bracket 100 and hence the sealing member 98 may be adjusted relative to the sealing member 98a by means of the adjustment screw 105 mounted in a bracket 106 and acting to pivot the sealing member about the pivot pin 104.

The sealing members 98, 98a are hollow and adapted to be filled with a silicone fluid which may be readily heated by the heating elements 108 and 108a secured, respectively, to caps 109 and 109a overlying the open upper ends of the sealing members and fixedly secured to the supporting posts 110 and 110a. The caps 109 and 109a may also support thermostatic control means 111 and 111a for controlling the temperature of the silicone fluid and hence the temperature of the sealing members.

The sealing members are driven from a sprocket 112 and meshing gears 113 and 114, the sprocket 112 being connected by a chain 115 to the machine drive. To prevent lateral flexing of the sealing members adjacent their upper ends, they may be contacted by pairs of rollers 112, 112 and 112a, 112a supported by a frame 113. Adjustment means, indicated generally at 114, are provided to adjust the positions of the rollers 112, 112 for contact with the sealing member 98 upon lateral adjustment of the latter.

Mounted adjacent the sealers 98, 98a are bottom sealers 115 and 115a which fuse and seal together the bottom edges of the inner and outer webs in a continuous seam which joins the lower edges of the transverse or side seams of the packet. The sealer 115 is mounted on a shaft 116 journaled in a mounting bracket 117 having an extension 118 pivotally connected to a supporting arm 119 by means of a pivot pin 120. Adjustment of the sealer 115 is by means of the threaded adjustment screw 121, the parts operating in substantially the same manner as the sealer 98. The bottom sealer is driven by means of a gear 122 which may be conveniently arranged to mesh with the teeth of gear 114. As in the case of the transverse sealers 98, the bottom sealer is hollow and filled with a silicone fluid adapted to be heated by a heating element 123 supported by a cap 124 fixed to a supporting post 125. It will be understood that the sealer 115a will be of like construction, excepting that the sealer 115 may be provided with spaced apart cutting edges 135 adapted to coact with mating recesses 135a in the sealer 115a to form tearing nicks 135c (Figure 14) in the bottom seam of each packet.

After the webs have been sealed, they are subjected to the action of a fly knife 126 coacting with a stationary knife 127, the knife 126 being timed to sever the continuous strip into individual packets surrounding the spring fingers. The fly knife 126 may be conveniently driven in timed relation to the movement of the spring fingers by means of a shaft 128 operatively connected to the machine drive.

Upon completion of the preheating, sealing and severing operations, the individual packets 129 (Figure 14) emerge moving along on the spring fingers, the packets each having a leading side seam 130 and a trailing side seam 131 joined together along their bottom edges by a bottom seam 132. The packets are divided by the central partition 10a into side-by-side compartments 133 and 134. Figure 15 illustrates the manner in which the bottom seam fuses together the lower edges of the folded outer web which forms the walls of the packet and the inner web which forms the central partition 10a.

*Packet expanding and filling mechanism*

After the packets have been severed into individual units they are moved along on the spring fingers, the bottom edges of the packets being slidably supported on a guide bar 136 underlying their path of travel. Mounted adjacent the upper open ends of the traveling packets is an endless chain 137 carrying gripping prongs 138 which, as the chain passes around the lower sprockets 139 and 140, are positioned to contact the outer surfaces of the spring fingers 16 and enter into the compartments 133 of the packets. Upon the introduction of the prongs into the packets, the chain and the prongs carried thereby are displaced laterally so as to expand the outer wall of each packet in the manner best seen in Figure 31. This opens the compartment 133 for the introduction of filling material therein. As illustrated in Figure 29, the prongs 138 may be provided in spaced pairs secured directly to the links of the chain 137; or, as seen in Figure 30, the prongs 138 may be mounted on a block 141 pivotally connected at 142 to an extension 143 of the chain link 144. In operation, the lower flight of the chain 137 travels with the packet until a charge of filling material has been introduced into the compartment 133, whereupon the chain moves upwardly around a sprocket 145, thereby withdrawing the prongs from the packet.

The charges of filling material for the compartments 133 are dispensed from a bevel feeder 146 having radially disposed passageways or pockets 147 in which increments or charges of filling material are measured for ejection into the compartments 133 as the bevel feeder rotates in synchronism with the movement of the packets.

As best seen in Figure 31, the bevel feeder comprises a rotatable head 148 fixed to a hollow shaft 149 having internal bearings 150, 151 which rotatably mount the head on the fixed shaft 152 which is supported at its lower end by means of a bracket 153 fixed to the frame member 154. The hollow shaft 149 is externally supported by the frame member 154, being rotatably journaled in the ball bearing assembly 155. The hollow shaft is rotated by means of a bevel gear 156 coacting with a second bevel gear 156a fixed to a shaft 157 journaled in a socket 158 and rotated by means of gear 159.

Filling material is introduced into the annular passageways or pockets 147 from a hopper 160 to which bulk material is supplied through an opening 161. The feeder is designed to dispense compactable materials which in general are not free flowing. Such materials must be fluffed-up in the hopper in order to obtain a substantially uniform density and thereby assure accurate measuring of the charges formed in the pockets 147. To this end the material in the hopper 160 will be agitated or fluffed-up by means of an agitator 162 rotatively mounted on a shaft 163 which is driven by means of a prime mover 164 through sprocket 165 and gears 166 and 167. At its lower end the shaft 163 may conveniently carry a rotating blade 168 mounted immediately adjacent the pocket of the bevel feeder being filled, the blade serving to sweep the material into the pockets and assure that each pocket will contain a full charge.

The charges or slugs of filling material introduced into the pockets 147 are discharged by means of plungers 169 slidably mounted in ways 170 in axial alignment with the pockets. The plungers mount cam followers 171 adapted to follow a cam surface 172, the cam surface 172 comprising the irregular edge of a cap member 173 overlying the central portion of the bevel feeder and fixed to the shaft 152. As the bevel feeder rotates in the direction of the arrow E (Figure 26), the open ends of the pockets are closed by the rim or flange 174 of a fixed cover plate 174a. While the ends of the pockets are so closed the plungers are moved outwardly by the cam surface 172 so as to compact the charges of filling material in the pockets. The fixed cover plate 174a coacts with the cap 173 to provide a guide channel 175 acting to maintain the cam followers 171 in contact with the cam surface 172. The flange 174 terminates just before each filled pocket comes into position above the compartment 133 of the underlying packet, and the plunger is thrown to discharge position by the rise 176 in the cam surface 172, thereby forceably discharging the charge of material into the open compartment 133 lying therebeneath. As the bevel feeder continues its rotary movement, the cam followers 171 come under the influence of the inclined cam surface 177 which returns the plungers to their retracted position and reopens the passageways 147 for refilling beneath the hopper.

Immediately opposite the bevel feeder 146, I prefer to mount a vibrator 178 which may be conveniently air actuated through a hose 179, the vibrator acting against the spring fingers to vibrate the filling material and cause it to settle in the packet. The spring fingers are also of assistance during filling in that they guide the material into the compartments acting more or less as chutes. They also serve as a shield to prevent filling material from falling on the far sides of the packets.

After the compartments 133 have been filled, the opposite side of each packet is contacted by a moving finger 180 which enters and expands the outer wall of the compartment 134, whereupon an increment of filling material is introduced into the compartment 134 by means of a second bevel feeder 181 to which the filling material is supplied from a hopper 182 (Figure 26). The moving finger 180 is mounted on one end of a reciprocating rod 182 fixed at its opposite end to a wheel 183 driven by means of a chain 184. Intermediate its ends the rod 182 is slidably received in a ball joint 185. In the instant embodiment of the invention it is contemplated that the second bevel feeder 181 will measure and introduce a free flowing charge of filling material into the compartment 134, and it is also contemplated that the second feeder need not compact the charge of filling material. Consequently, the feeder 181 may simply comprise a rotatable head 191 having radial passageways 192 into which the material is fed by gravity from the hopper 182a through the filling spout 193. The head 181 is mounted on a shaft 194 journaled in a mounting bracket 195 fixed to the machine frame, the shaft 194 being driven by means of a chain 196 operatively connected to a driven shaft 197. The shaft 197 is driven from the machine drive and serves also to drive the bevel feeder 146, acting through the gears 159 and 198.

The filling material introduced into the passageways 192 will be deposited, as the second feeder rotates, in the compartments 134 by gravity flow. It will be understood, however, that where the filling material to be introduced into compartment 134 is of such nature that it must be first fluffed-up and then compacted, plunger mechanism such as that employed with the bevel feeder 146 may be used.

Subsequent to the filling of the compartments 134, the filled packets are removed from the spring fingers by means of a stripper 200 which engages the top edges of the packets and pushes them downwardly, thereby freeing them from the fingers. The stripper 200 is mounted on a reciprocating shaft 201 connected at its opposite end to a wheel 202, the stripping means operating in much the same fashion as the reciprocating finger 180 described hereinbefore.

*Packet flattening and top sealing mechanism*

As the packets are stripped from the spring fingers they are deposited in an upright position on a guide way 205 being supported on either side by side guides 206 and 207. The packets are immediately engaged and moved forward by a traveling chain 208 having spaced apart lugs 209 which contact the trailing edges of the packets and move them forward in spaced apart timed relation. A vibrator 210 may be conveniently associated with the guide way 205 to again vibrate the packets to settle the filling materials therein.

Referring now to Figures 34 and 35 of the drawings, as the packets are moved along by the lugs 209 their trailing transverse seams are engaged by opposed pairs of traveling gripping elements 211 and 211a carried by traveling chains 212 and 212a, the arrangement being such that the upper portion of the trailing edge of each packet will be firmly engaged between the opposed gripping members. Spring biased guide plates 213 and 213a are employed to urge the chains 212 and 212a toward each other and thereby bring the mating pairs of gripping members 211 and 211a into packet gripping relation.

Once the trailing edge of each packet is firmly engaged between the gripping members 211 and 211a, the leading edge of the packet is gripped between an opposed pair of rotating cam grippers 214 and 214a having enlarged portions 215 and 215a arranged to rotate at a peripheral speed in excess of the lineal speed of the packets. The cam grippers engage the leading edges of the packets adjacent their upper ends and, due to their more rapid movement, they pull against the packets and tend to stretch or flatten out the tops of the packets, thereby bringing the upper edges of the expanded walls into juxtaposition with the central partition.

As best seen in Figure 36, each of the gripping cams, such as the cam 214, is rotatably journaled on a shaft 216 to which is fixed a driving key 217 operatively connected by a spring 218 to the cam gripper. As the shaft 216 is rotated by the machine drive the driving key 217 will be rotated by the shaft and through the spring 218 will rotate the cam gripper 214. Since the amount of stretching or flattening required by the individual packets will vary, it is desirable that the stretching or pulling action of the gripping cams cease once the top edges of the packets have been juxtaposed. If the positive pulling action were to continue, it would result either in the trailing edges of the packets being pulled from between the gripping members 211 and 211a or in the tearing or splitting of the walls of the packets. With the spring drive just described the peripheral speed of the gripping cams may be retarded to equal the lineal speed of the advancing packets, the more rapidly moving driving key simply expanding the spring 218, as illustrated in Figure 37. Then when the enlarged portion 215 of the cam gripper passes beyond the packet, it will be freed and will come under the influence of the spring 214 which will rapidly advance the cam gripper until the rear edge of the driving key is contacted by the stop 219, the parts thus being returned to their normal operating position.

It has been found desirable to utilize a second pair of cam grippers 220, 220a to assure proper flattening and juxtaposition of the packet walls. It is also desirable to mount the cam grippers 214 and 220 on adjustable brackets 221 and 222 to compensate for variations in the thickness of the packets. As the packets pass beyond the trailing set of cam grippers 220 and 220a, their trailing edges are released from between the gripping members 211 and 211a, the packets continuing their forward movement under the influence of the driving lugs 209.

Referring now to Figures 38 and 39 of the drawings, the packets are next fed between preheating belts 222 and 222a which pass around leading sheaves 223 and 223a and trailing sheaves 224 and 224a. Heated pressure plates 225 and 225a extend between the leading and trailing sheaves and serve to juxtapose and heat the inner flights of the belts 222 and 222a. It will be understood that the belts will be formed from heat conducting material. As the upper edges of the packets 129 pass between the belts the juxtaposed upper edges thereof will be preheated for subsequent sealing by means of the sealing wheels 226 and 226a. The sheaves 223 and 224 are mounted on an adjustable support 227 by means of which the spacing between the preheating belts may be adjusted. Suitable drive means including the driving sprocket 228, intermediate sprockets 229 and 230, and gears 231 and 232 which drive the opposite set of sheaves 223a and 224a, are provided, as illustrated.

The top sealing wheels 226 and 226a will be constructed in substantially the same manner as the bottom sealer 115, the sealing wheels being formed as parts of hollow bodies containing a silicone fluid. The sealing wheel 226 will be adjustable by means of an adjustment screw 233 and driven by means of a sprocket 234 connected to the sprocket 235 of the preceding machine section. A gear 236 operatively connects the sealer 226 and the coacting sealer 226a.

The completely sealed packet is illustrated in Figures 40 and 41 wherein it will be seen that the top seam 238 fuses together the upper ends of the packet walls and the central partition. The resultant packet is thus sealed along all four sides with the two increments of filling material contained in the sealed compartments 133 and 134.

Packet rejecting mechanism

Upon passage of the packets beyond the top sealers they are conveyed by the chains 208 and lugs 209 to a device which will detect and reject packets which have not received the proper charges of filling material. Referring now to Figures 42 and 43 of the drawings, the packets are adapted to travel between a spaced apart pair of rotating discs 240 and 241 which are normally spaced apart by a distance substantially equal to the thickness of the filled packets, the periphery of the discs contacting opposite sides of the filled packets. The disc 241 is fixed to a vertically disposed shaft 242 having a sprocket 243 at its lower end by means of which the shaft is rotated, the sprocket being driven from a driven shaft 244 by means of a chain 245. The disc 240 is mounted on a shaft 246 which is also driven from the drive shaft 244 by means of a chain 247 and a sprocket 248, but the shaft 246 is journaled in an adjustable mounting bracket 249 having an extension 250 by means of which it is pivotally secured to a support 251 fixed to the machine frame. A spring 252 biases mounting bracket 249 in the direction of the packets.

Biasing movement of the disc 240 in the direction of the packets is limited by a cam roller 253 fixed to a support 254 secured to the machine frame, the cam roller being contacted by a spacing cam 255 which, as it bears against the cam roller 253, will maintain the disc 240 spaced from the disc 241 by a distance substantially equal to the thickness of the filled packet. The spacing cam 255 is, however, provided with recesses 256 adapted to be presented to the cam follower 253 in synchronism with the passage of successive packets between the discs 240 and 241. Movement of the cam follower into any of the recesses 256 permits the entire assembly to move inwardly under the influence of the spring 252. This inward movement is normally prevented by the filled packet itself which, in its position between the two discs, is contacted by the disc 240 and prevents the disc and the mounting assembly from moving inwardly. If, however, a packet is not present between the discs or, if present, the packet is improperly filled and hence not of standard thickness, the disc 240 will be free to move inwardly. The inward movement of the disc 240 causes the arm 257 to contact a limit switch 258 which closes a circuit 259 to actuate a solenoid 260, the solenoid in turn raising a lifting member 261. It will be understood that the disc will be returned to its original position as soon as the recess passes beyond the cam follower.

A head 262 is mounted on the upper end of the shaft 242 which, it will be remembered, rotates the disc 241, the head 262 having a channel 263 therein (Figures 46 and 47) in which a tilting bar 264 is tiltably mounted by means of a pivot pin 265. The tilting bar 265 will normally occupy the horizontally disposed position illustrated in solid lines in Figure 46, but it may be tilted up or down about the pivot pin 265 as in the manner illustrated in dotted lines in Figure 46. When tilted from the horizontal position it is desired that the tilting bar will remain in tilted position until positive force is applied to return it to the horizontal; and to this end the bar may be biased against a friction washer 266 by means of a spring 267 mounted in the head. The tilting bar will, of course, rotate with the shaft 242 and the disc 241.

As best seen by reference to Figure 44, the movement of the tilting bar is so arranged that one end thereof, such as the end 268, will overlie the lifting member 261 in synchronism with the passage of the packets between the detecting discs. With this arrangement, if a packet is missing or inadequately filled, the actuation of the solenoid 260 upon inward movement of disc 240 will cause the lifting member 261 to move upwardly in the manner illustrated in dotted lines in Figure 45, thereby pushing upwardly on the end 268 of the tilting bar, thereby inclining the opposite end 269 of the bar downwardly, the bar being retained in the inclined position by means of its frictional engagement in the channel 263.

As the tilting bar continues to rotate with its end 269 inclined downwardly, the downwardly inclined end is caused to strike a roller 271 mounted on the end of a pivoted arm 272, the striking of the roller by the bar causing the arm 272 to move into contact with a limit switch 273. The closing of the limit switch actuates a solenoid 274 to open a valve 275 which releases a blast of compressed air through a nozzle 276, the blast of air being directed against the side of the improperly filled packet so as to blow the packet laterally through an opening in the guide rail for collection in a reject box. Immediately after striking the roller 271 the downwardly inclined end 269 of the tilting bar contacts the sloping face 261a of the lifting member 261 which lifts the end 269 of the tilting bar, thereby returning it to its original horizontal position. It will be understood that the rotary movement of the tilting bar 264 will be so timed that it will rotate through substantially 180° during the time interval required for a defective packet to pass from between the discs 240 and 241 to a position adjacent the nozzle 276. Properly filled packets will, of course, pass beyond the nozzle 276, being moved along by the lugs 209 for discharge at the end of the machine.

Alternative embodiments

In Figures 48 through 50, I have illustrated an alternative embodiment of the preheating and sealing means for forming the transverse and bottom seams of the packets. As illustrated therein the webs of sheet material which will have been juxtaposed in the manner described hereinbefore will be first passed between rotating preheaters 280 and 280a having elongated heating bars 281 and 281a extending longitudinally thereof in spaced relation for preheating spaced apart transverse areas of the webs. The webs are then passed between banks of elongated heating rods 282 and 282a mounted, respectively, on frames 283 and 283a, the banks of heating rods normally lying to opposite sides of the advancing webs in substantially the position illustrated in Figure 50. It will be understood that the heat radiated by the electrically heated heating rods will soften the fusible surfaces of the webs for subsequent transverse sealing by means of the transverse sealing members 284 and 284a and the bottom sealing members 285 and 285a. Adjustment of the banks of heating rods toward and away from the webs may be conveniently obtained by mounting the frame members 283 and 283a on platforms 286 and 286a which are welded or otherwise permanently fixed to gears 287 and 287a in the manner best seen in Figure 50. The gears 287 and 287a are mounted on shafts 288 and 288a journaled in supporting sleeves 289 and 289a secured to a frame member 290. The shaft 288a also mounts a bracket 291 connected by a chain 292 to a hand wheel (not shown) or the like for adjusting the position of the heaters. Rotation of the shaft 288a will cause rotation of the gears 287 and 287a, thereby tilting the platforms 286 and 286a and moving the banks of heating rods toward or away from the webs, depending upon the direction in which the shaft 288a is rotated. This form of preheating means has been found to be highly satsifactory and the all over heating of the webs, if properly controlled, have not been found to impair in any way the physical characteristics or appearance of the webs.

Figures 48 and 49 also illustrate an alternative arrangement of package nicking means in the form of a collar 292 carried by the bottom sealer 285, the collar mounting spaced apart knives 293 arranged to provide nicks or cuts 294 and 295 in the side seams 130 and 131, respectively, of the packets, as seen in Figure 51. The nicks or cuts are spaced upwardly from the bottom seam 132 so as to facilitate the tearing open of the packet adjacent its bottom edge.

Figures 52, 53 and 54 illustrate a preferred form of compartment opening and expanding means for opening the compartments 134. Basically the device corresponds to the means illustrated in Figure 26 in that a reciprocating rod 296 is connected at one end to the wheel 183 for movement thereby. Near its opposite end the rod is slidably received in a swivel sleeve 297 pivotally connected to a post 298 secured to an adjustable bracket 299 the rod being thereby mounted for reciprocating movement under the influence of the wheel 183. A clamp 300 is secured to the rod 296 above the swivel sleeve 297, the clamp fixedly supporting a depending arm 301 having a bell crank 302 pivoted thereto, the bell crank carrying an arm 303 on its lower end mounting a flat blade or finger 304. A spring 305 extends between the bell crank and the depending arm 301, the spring serving to bias the bell crank to a position in which a stop 306 carried thereby abuts the lower end of the arm 301, in which position the blade or finger 304 abuts a guide plate 307 mounted to the machine frame immediately above the path of travel of the packets.

Figure 54 illustrates the position of the parts when the rod 296 is at the top of its stroke, in which position the blade of finger 304 contacts the guide 307. As the rod moves downwardly the blade 304 will be caused to enter the compartment 134 of the underlying packet, it being understood that the timing of the parts will be such that each successive packet will be presented in a position to be contacted by the blade as the rod begins its downstroke. As the rod approaches the bottom of its stroke the parts will assume the position illustrated in Figure 53 in which position the blade is inserted into the compartment. Before reaching the bottom of its stroke, the rearwardly extending arm 308 of the bell crank contacts a stop 309 secured to a bracket 310; and as the downward movement continues the bell crank is caused to rock in a counterclockwise direction, as viewed in Figure 53, against the compression of the spring 305. This rocking movement causes the blade 314 to move laterally away from the packet, thereby expanding the outer wall of the compartment 134, whereupon the rod starts its upstroke which acts to withdraw the blade from the then expanded compartment.

Figure 55 illustrates an alternative means for stripping the filled packets from the spring fingers. As seen therein, the stripping action is accomplished by means of stripping bars, such as the bar 311, having projections 312 which contact the upper edges of the packet. The stripping bar is horizontally disposed and mounted for downwardly inclined movement in the direction of the arrow F on spaced apart traveling chains 313 and 314 passing around sprockets mounted on the inclined shafts 315 and 316 one of which is driven in timed relation to the movement of the spring fingers. It will be apparent that as the stripping bar travels downwardly with the advancing packet it will cause the packet to be stripped from the fingers and thereby released for subsequent engagement for movement through the next section of the machine.

Additional modifications and arrangements of parts may be made without departing from the spirit of my invention. Having, however, described an exemplary embodiment of my invention together with certain preferred alternative arrangements of parts, what I desire to secure and protect by Letters Patent is:

1. A packaging machine comprising, in combination, means for feeding and medially folding a first web of sheet material, means for interposing therebetween and feeding a second web of sheet material, means for sealing said webs to form a row of double compartment packets having a common central wall, means for engaging and conveying said row of packets in a predetermined path of travel, means for severing said strip of packets into individual units and for conveying said units in a path of travel, mechanism acting successively on each packet to open and fill first one compartment and then the other, and mechanism for sealing each packet closed across its open end so as to close and seal both compartments thereof.

2. A packaging machine comprising, in combination, means for feeding and medially folding a first web of sheet material, means for interposing therebetween and feeding a second web of sheet material, means for sealing said webs to form a continuous strip of double compartment packets open end up, supporting means including spring fingers for engaging each packet in said strip for conveying it in a path of travel, means for severing said strip into individual packets, mechanism acting successively on each compartment of each packet to open each compartment thereof, to deposit a charge of filling material therein, and mechanism for sealing the packet closed across its open end so as to close and seal both compartments thereof.

3. In a machine for forming and filling packets, means for feeding and medially folding a first web of sheet material, means for interposing and feeding a second web of sheet material between the folded sides of the first web, means for sealing said webs to form a strip of double compartment packets having open upper ends, means including spring fingers engaging the compartments of said packets to support and convey the strip of packets, means for severing the strip of packets into individual packets supported on said conveying means, compartment engaging means for entering one compartment of the packets to expand the outer wall thereof, filling means for depositing a measured increment of filling material in the expanded compartment, means for opening the opposite compartment of the packet and for expanding the outer wall of the last named compartment, secondary filling means for introducing an increment of filling material into said last named compartment, and sealing means for sealing closed the open upper end of the packet so as to close and seal both compartments thereof.

4. In a machine for forming and filling packets, means for continuously forming webs of sheet material into a strip of double compartment packets having open upper ends, means for supporting and conveying the strip of packets in a path of travel, means for severing the strip of packets into individual packets supported on said supporting and conveying means, compartment expanding means for entering one compartment of the packets to expand the outer wall thereof, filling means for depositing a metered charge of filling material in the expanded compartment while said expanding means maintains the compartment in expanded condition, means for opening the opposite compartment of the packet and for expanding the outer wall of said last named compartment, filling means for introducing an increment of filling material into said last named compartment upon the removal of the opening and expanding means therefrom, means for removing the packets from said supporting and conveying means, and sealing means for sealing closed the open upper ends of the packets so as to close and seal both compartments thereof.

5. In a machine for forming and filling packets, means for continuously feeding inner and outer webs of sheet material, forming means for folding said outer web about said inner web, traveling blocking and guiding means for engaging the webs, sealing means for sealing together said webs to form a strip of double compartment packets having open upper ends and supported on said blocking and guiding means, shearing means for severing the strip of packets into individual packets supported by said blocking and guiding means, compartment expanding means for entering one compartment of each packet to expand the outer wall thereof, rotary filling means for depositing a metered charge of filling material into the expanded compartment, a moving finger for opening the opposite compartment of each packet and for expanding the outer walls of said last named compartment, secondary filling means for introducing filling material into said last named compartment, stripping means for removing the packets from said blocking and guiding means, stretching means for flattening and juxtaposing the open upper ends of the filled packets, and sealing means for sealing closed the flattened ends of each packet so as to close and seal both compartments thereof.

6. In a machine for forming and filling packets, means for continuously feeding inner and outer webs of sheet material, forming means for folding said outer web about said inner web, traveling blocking and guiding means for engaging the webs, sealing means for sealing together said webs to form a strip of double compartment packets having open upper ends and supported on said blocking and guiding means, shearing means for severing the strip of packets into individual packets supported by said blocking and guiding means, compartment expanding means for entering one compartment of each packet to expand the outer wall thereof, rotary filling means for depositing a metered charge of filling material into the expanded compartment, a moving finger for opening the opposite compartment of the packet and for expanding the outer wall of said last named compartment, secondary filling means for introducing filling material into said last named compartment, stripping means for removing the packets from said blocking and guiding means, stretching means for flattening and juxtaposing the open upper ends of the filled packets, sealing means for sealing closed the flattened ends of each packet so as to close and seal both compartments thereof, and packet rejecting means for rejecting improperly filled packets.

7. In a machine for forming and filling double compartment packets, means for continuously feeding inner and outer webs of sheet material, means for folding the outer web of sheet material about the inner web with the folded sides of the outer web juxtaposed to opposite sides of the inner web, spaced apart pairs of travelling spring fingers for engagement with opposite sides of the inner web, preheaters for contact with the folded webs in transverse areas between adjacent pairs of spring fingers, sealing means for contacting the preheated transverse areas of the moving webs to seal them together to form side seams for the packets, bottom sealing means for sealing together the bottom edges of the webs, severing means for severing the strip of packets so formed into individual packets supported on said spring fingers, gripping prongs travelling with said spring fingers for entering into one compartment of each packet to expand the outer wall of the compartment, a rotary filling head overlying the path of travel of said packets for introducing measured increments of filling material in the expanded compartments, a moving finger for entering and expanding the outer wall of the remaining compartment of each packet, a secondary rotary filling head overlying the path of travel of said packets for introducing filling material into the last named compartment, stripping means for removing the packets from said gripping fingers, conveying means for engaging said packets for forward movement, gripping members for clamping engagement with the trailing edges of the packets and coacting gripping members for engaging the leading edges of the packets, said coacting gripping members acting to more rapidly advance the leading edges of the packets and thereby cause the packets to be flattened and the upper edges of their walls juxtaposed, preheating means for preheating the juxtaposed upper edges of the packets, sealing means for sealing closed the tops of the packets, and packet rejecting means for rejecting packets which have been improperly filled.

8. In a machine for forming and filling packets, means for continuously feeding inner and outer webs of sheet material, forming means for folding the outer web about the inner web, traveling blocking and guiding means for engaging and supporting said inner web, said blocking and guiding means comprising pairs of fingers adapted to enter between the folded sides of the outer web with the individual fingers of each pair engaging opposite sides of the inner web.

9. The device claimed in claim 8 wherein the outer web is folded medially about the lower edge of a forming plate, wherein the forming plate terminates rearwardly in a separator adapted to be contacted by the pairs of fingers and acting to spread apart the fingers in each pair, said separator terminating downwardly in spaced apart extensions which enter between the folded sides of the outer web and between which the inner web is adapted to travel, whereby said pairs of fingers will be spread apart as they pass over said separator and positioned for engagement with opposite sides of the inner web.

10. In a machine for forming and filling packets wherein continuous lengths of heat sealable sheet material are juxtaposed and continuously moved in a path of travel, mechanism for heat sealing the juxtaposed lengths of sheet material in predetermined areas thereof to form a continuous strip of open ended packets, said mechanism comprising preheating means positioned on opposite sides of the juxtaposed sheet material for preheating predetermined areas thereof, sealing means for thereafter contacting the preheated sheet material to form spaced apart transverse seams therein defining the side seams of the individual packets and a continuous bottom seam extending longitudinally along the bottom of the juxtaposed sheet material, said preheating means comprising a plurality of spaced apart transversely disposed preheating bars traveling in timed relation to the movement of the juxtaposed sheet material, and said sealing means comprising a first pair of coacting sealing members adapted to make sealing contact with the spaced apart transverse areas preheated by said preheating bars and a second pair of coacting sealing members for sealing the bottom edges of the juxtaposed sheet material.

11. The device claimed in claim 10 wherein said preheating bars are mounted for movement in an annular path around a plate having a pair of spaced apart annular channels therein, wherein said channels are filled with a current conducting fluid, and wherein contacts for supplying electric current to said preheaters are in contact with the fluid in said channels, said contacts being mounted for movement with said preheating bars.

12. In a machine for forming and filling packets wherein continuous lengths of heat sealable sheet material juxtaposed and continuously moved in a path of travel, mechanism for heat sealing the juxtaposed lengths of sheet material in predetermined areas thereof to form a continuous strip of open ended packets, said mechanism comprising preheating means positioned on opposite sides of the juxtaposed sheet material for preheating predetermined areas thereof, sealing means for thereafter contacting the preheated sheet material to form spaced apart transverse seams therein defining the side seams of the individual packets and a continuous bottom seam extending longitudinally along the bottom of the juxtaposed sheet material, said sealing means comprising a pair of rotary sealing members mounted one on each side of the said juxtaposed sheet material, said rotary members having coacting sealing bars for contacting the preheated areas of the sheet material, said rotary members being hollow and containing a heatable fluid, and a heating element submerged in said fluid said rotary sealing members being supported from beneath on driven shafts, said rotatable members being contacted adjacent their upper ends by positioning rollers fixed to the machine frame.

13. In a machine for forming and filling packets wherein double compartment packets are supported open end up by traveling supporting means, means for entering into one compartment of each packet and expanding the outer wall thereof for filling, and filling means overlying the path of travel of the expanded compartments for introducing an increment of filling material therein, said filling means comprising a rotary filling head moving in timed relation to the movement of said packets, said compartment engaging and expanding means comprises a moving chain carrying spaced apart prongs adapted to enter into the compartments for gripping engagement with the outer walls thereof, a portion of said chain being arranged to diverge with respect to the path of travel of the packets so as to move the said prongs laterally and thereby expand the outer walls of the compartments.

14. In a machine for forming and filling packets wherein double compartment packets are supported open end up by traveling supporting means, means for entering into one compartment of each packet and expanding the outer wall thereof for filling, and filling means overlying the path of travel of the expanded compartments for introducing an increment of filling material therein, said filling means comprising a rotary filling head moving in timed relation to the movement of said packets, said compartment expanding means comprising a compartment engaging finger mounted on a reciprocating rod driven in timed relation to the movement of the packets.

15. The device claimed in claim 14, wherein said rod is slidably journaled intermediate its ends in a swivel member, whereby to impart bi-directional movement to said finger.

16. The device claimed in claim 15 wherein said finger is operatively connected to said rod by means of a bell crank, and wherein means are provided to trip said bell crank upon the entry of said finger into each packet, said bell crank acting to displace said finger laterally to thereby expand the adjacent outer wall of the packet.

17. In a machine for forming and filling packets wherein the packets are supported on moving spring fingers, means for removing the packets from said spring fingers, said means comprising a stripping element adapted to contact the upper edge of each packet and move the packet downwardly out of engagement with the spring fingers, said stripping element moving in synchronism with the movement of the advancing packets.

18. The device claimed in claim 17 wherein said stripping member is mounted on one end of a reciprocating rod slidably received intermediate its ends in a swivel member fixed to the machine frame.

19. The device claimed in claim 17 wherein said stripping means is fixed to a spaced apart pair of chains lying adjacent the path of travel of the packets and inclined with respect thereto.

20. In a machine for forming and filling packets wherein filled packets are conveyed open end up along a path of travel, mechanism for tensioning and sealing the upper edges of the packets, said mechanism comprising traveling gripping means for engaging the trailing edges of each packet, coacting gripping means for engaging the leading edges of each packet, said last named gripping means traveling at a speed greater than the speed of said first named gripping means, whereby to tension and flatten the packets therebetween, and top sealing means for contacting the flattened packets to seal the upper ends thereof closed.

21. The device claimed in claim 20 wherein said gripping means for engaging the leading edges of the packets comprise rotary gripping members traveling at a peripheral speed greater than the lineal speed of the packets.

22. The device claimed in claim 21 wherein said rotary gripping members are rotatably journaled on driving shafts and are driven from the shafts by means of driving keys fixed to the shafts and to which said rotary members are connected by means of expandable spring members.

23. In a machine for forming and filling packets wherein the filled and sealed packets are conveyed along a path of travel for discharge from the machine, detecting mechanism for rejecting improperly filled packets, said detecting mechanism comprising spaced apart rotating detecting discs adapted to contact opposite sides of the filled packets as the packets pass therebetween, one of said detecting discs being displaceable toward the other of said discs upon the passage therebetween of an improperly filled packet, the inward displacement of said first named disc serving to actuate time delay mechanism effective to direct a jet of compressed air against the improperly filled packet after it has passed beyond the detecting discs to displace the packet laterally from the path of travel of the packets.

24. The device claimed in claim 23 wherein said time delay means includes a contact bar rotating with the other of said detecting discs, said contact bar being movable from a first to a second position, means responsive to the inward displacement of said first named detecting disc for moving said contact bar from the first to the second position, and control means for contact by said contact bar when in the second position, said control means being operatively connected to a valve for controlling the jet of compressed air.

25. The device claimed in claim 24 wherein means are provided for returning said contact bar to the first position subsequent to contact with said control means.

26. The device claimed in claim 25 wherein means are provided for locking said first named detecting disc against inward displacement during the intervals between the passage of adjacent packets between the detecting disc.

27. In a machine for forming and filling packets, means for continuously feeding inner and outer webs of sheet material, forming means for folding the outer web about the inner web, traveling pairs of fingers arranged to enter between the folded sides of the outer web with the individual fingers of each pair lying on opposite sides of the inner web, a separator positioned to be contacted by the pairs of fingers and acting to spread apart the fingers in each pair as they approach the webs of sheet material, said separator terminating downwardly in spaced apart extensions which enter between the folded sides of the outer web and between which the inner web is adapted to travel, whereby said pairs of fingers will be spread apart as they pass over said separator and positioned on opposite sides of the inner web.

28. In a machine for forming and filling packets, means for continuously feeding inner and outer webs of sheet material, forming means for folding the outer web about the inner web, traveling pairs of fingers arranged to enter between the folded sides of the outer web with the individual fingers of each pair engaging opposite sides of the inner web, sealing means for sealing together said webs to form a continuous strip of double compartment packets having open upper ends and a common central wall engaged by said pairs of fingers, shearing means for severing the continuous strip of packets into individual packets each supported by a pair of said fingers, means for introducing a charge of filling material into the compartments of each packet, means for thereafter removing the filled packets from said fingers and for advancing them in a path of travel, means for flattening and juxtaposing the open upper ends of the filled packets, and sealing means for sealing closed the flattened upper ends of each packet to close and seal both compartments thereof.

References Cited in the file of this patent

UNITED STATES PATENTS

| | | |
|---|---|---|
| 529,908 | Hill | Nov. 27, 1894 |
| 1,895,899 | Schaub | Jan. 31, 1933 |

(Other references on following page)

UNITED STATES PATENTS

| | | |
|---|---|---|
| 2,038,452 | Sharkey et al. | Apr. 21, 1936 |
| 2,195,740 | Salfisberg | Apr. 2, 1940 |
| 2,390,071 | Barnett | Dec. 4, 1945 |
| 2,401,110 | Rohdin | May 28, 1946 |
| 2,497,212 | Donofrio | Feb. 14, 1950 |
| 2,547,836 | Pfeiffer | Apr. 3, 1951 |
| 2,565,444 | Waters | Aug. 21, 1951 |
| 2,615,200 | Cloud | Oct. 28, 1952 |
| 2,636,731 | Howard | Apr. 28, 1953 |
| 2,649,671 | Bartelt | Aug. 25, 1953 |
| 2,649,673 | Bartelt | Aug. 25, 1953 |
| 2,695,171 | Coffman | Nov. 23, 1954 |
| 2,718,105 | Ferguson | Sept. 20, 1955 |
| 2,721,017 | Hiscock | Oct. 18, 1955 |
| 2,746,223 | Fischer | May 22, 1956 |
| 2,754,644 | Vergobbi et al. | July 17, 1956 |